United States Patent [19]

Imazeki et al.

[11] Patent Number: 4,528,113

[45] Date of Patent: Jul. 9, 1985

[54] ANTHRAQUINONE DYE AND LIQUID CRYSTAL COMPOSITION CONTAINING THE DYE

[75] Inventors: Shuji Imazeki; Akio Mukoh; Mikio Sato, all of Ibaraki; Masaharu Kaneko, Kanagawa; Tetsuo Ozawa, Tokyo; Tomio Yoneyama, Kanagawa, all of Japan

[73] Assignees: Mitsubishi Chemical Industries Limited; Hitachi Limited, both of Tokyo, Japan

[21] Appl. No.: 593,788

[22] Filed: Mar. 27, 1984

[30] Foreign Application Priority Data

Mar. 29, 1983 [JP] Japan ................................ 58-53175

[51] Int. Cl.$^3$ ........................ C09K 3/34; G02F 1/13; C09B 1/58; C09B 1/60; C09B 1/22
[52] U.S. Cl. ................................ 252/299.1; 260/377; 350/349
[58] Field of Search ............... 350/349; 252/299.1; 260/377, 376

[56] References Cited

U.S. PATENT DOCUMENTS

| | | | |
|---|---|---|---|
| 3,475,173 | 10/1969 | Kimura et al. | 252/299.1 |
| 4,360,447 | 11/1982 | Morinaka et al. | 252/299.1 |
| 4,405,211 | 9/1983 | Harrison et al. | 252/299.1 |
| 4,464,282 | 8/1984 | Harrison et al. | 252/299.1 |
| 4,466,899 | 8/1984 | Ditter et al. | 252/299.1 |
| 4,483,593 | 11/1984 | Imazeki et al. | 252/299.1 |

FOREIGN PATENT DOCUMENTS

| | | | |
|---|---|---|---|
| 75173 | 3/1983 | European Pat. Off. | 252/299.1 |
| 76633 | 4/1983 | European Pat. Off. | 252/299.1 |
| 93367 | 11/1983 | European Pat. Off. | 252/299.1 |
| 98736 | 1/1984 | European Pat. Off. | 252/299.1 |
| 2009469 | 9/1971 | Fed. Rep. of Germany | 252/299.1 |
| 2614604 | 10/1977 | Fed. Rep. of Germany | 260/377 |
| 3038372 | 5/1981 | Fed. Rep. of Germany | 252/299.1 |
| 48-92667 | 12/1973 | Japan | 252/299.1 |
| 57-49686 | 3/1982 | Japan | 252/299.1 |
| 57-92079 | 6/1982 | Japan | 252/299.1 |
| 92080 | 6/1982 | Japan | 252/299.1 |
| 1334707 | 10/1973 | United Kingdom | 252/299.1 |
| 2033929 | 5/1980 | United Kingdom | 252/299.1 |
| 2074182 | 10/1981 | United Kingdom | 252/299.1 |

*Primary Examiner*—Teddy S. Gron
*Attorney, Agent, or Firm*—Sughrue, Mion, Zinn, Macpeak and Seas

[57] ABSTRACT

An anthraquinone dye and a liquid crystal composition containing the dye are disclosed.

The liquid crystal composition is preferably used in an electro-optic cell which enables a good color display utilizing the guest-host effect of the liquid crystal.

9 Claims, 5 Drawing Figures

ANTHRAQUINONE DYE AND LIQUID CRYSTAL COMPOSITION CONTAINING THE DYE

FIELD OF THE INVENTION

The present invention relates to an anthraquinone dye and a liquid crystal composition containing the dye. More particularly, it relates to a liquid crystal composition containing a dye for use in an electro-optic cell, which is interposed between two opposite electrode plates and enable a good color display utilizing the guest-host effect of the liquid crystal.

BACKGROUND OF THE INVENTION

Pleochroic dyes are roughly classfied into two groups. One group dyes are those in which the direction of transition moment of visible light absorption is almost in parallel with the direction of the longer axis of the molecule and which, when dissolved as a guest molecule in a host liquid crystal, are aligned so that the alignment direction of the longer axis of the dye molecule becomes the same as that of the axis of oriented liquid crystal molecule. Such dyes are called pleochroic dyes having parallel dichroism (or P-type dyes). The other group dyes are those in which the direction of transition moment of visible light absorption is almost perpendicular to the direction of the longer axis of molecule and which, when dissolved as a guest molecule in a liquid crystal, are aligned so that the aligment direction of the longer axis of the dye molecule becomes the same as that of the axis of oriented liquid crystal molecule. Such dyes are called pleochroic dyes having perpendicular dichroism (or N-type dyes). The present invention relates to a dye belonging to the first group, i.e., a pleochroic dye having parallel dichroism, and a liquid crystal composition containing the dye.

Pleochroic dyes are chracterized in that the degree of light absorption depends upon the relative relation between the direction of absorption transition moment of dye molecule and that of electric vector of light. That is, the absorption becomes maximum when the direction of absorption transition moment is in parallel with the electric vector of light, and becomes minimum when the direction of absorption transition moment is perpendicular to the electric vector of light.

When a nematic, cholesteric or smectic liquid crystal containing such pleochroic dye is sandwiched between facing two electrodes and a voltage is applied to it across the electrodes, the liquid crystal molecules exhibit turbulent motion or are uniformly aligned along the direction of electric field depending upon the dielectric characteristics or fluid characteristics of the liquid crystal. In this occasion, the pleochroic dye molecules also move together with the liquid crystal molecules, and hence relative relation between the direction of absorption transition moment of the pleochroic dye molecule and the electric vector of incident light is changed, and consequently, the light absorption characteristics of a liquid crystal display devices are changed.

Such a phenomenon is widely known as "guesthost effect" and a color display device using electric control can be constituted by utilizing this effect (see "Guest-Host Interaction in Nematic Liquid Crystals: A New Electro-Optic Effects" reported by G. H. Heilmeier and L. A. Zanoni in Applied Physics Letters, Vol. 13, p. 91 (1968)).

Figure 1:
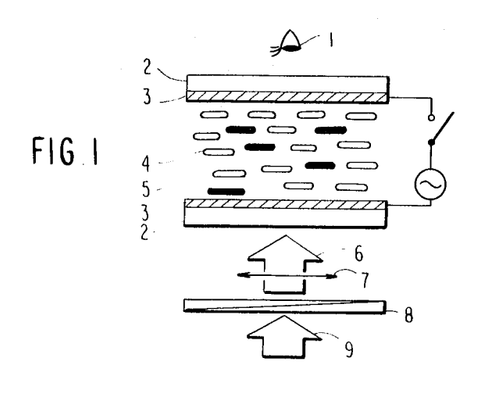
FIG. 1 is a schematic view showing an element device according to the example of the present invention in a non-voltage-applied state.
Figure 2:
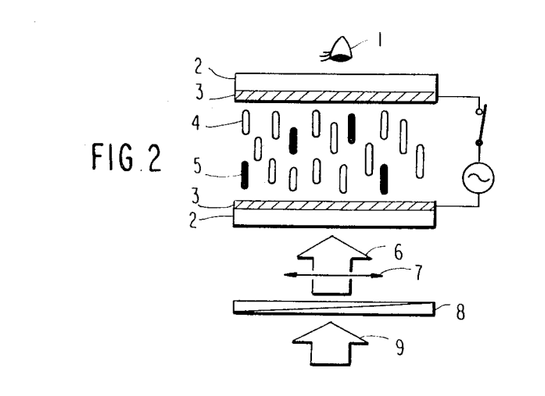
FIG. 2 is a schematic view showing an element device according to the example of the present invention in a voltage-applied state.

For example, when a nematic liquid crystal containing a pleochroic dye showing a parallel dichroism and having a positive dielectric anisotropy is interposed between two transparent electrode plates having been subjected to homogeneous orientation treatment on each side to be in contact with the liquid crystal and facing in parallel with respect to each other, the liquid crystal molecules form a homogeneous alignment wherein the long axes of the molecules are aligned in a given direction parallel with the electrode planes (see FIG. 1). In this situation, the pleochroic dye molecules 5 dissolved in the liquid crystal are also aligned so that their long axes are also parallel with the electrode planes in the same direction. When white light 6 having travelling in a direction perpendicular to the electrode plane and which is polarized in the same direction as the alignment direction of liquid crystals by a polarizing plate 8 is transmitted through the guest-host material in the above-described alignment, its electric vector becomes parallel with the long axes of the pleochroic dye molecules, and hence a specific wavelength region is strongly absorbed by the pleochroic dye molecules. As a result, the guest-host material appears strongly colored. Then, when an electric field is applied to the liquid crystal material in the above-described alignment through the aforesaid transparent electrode plates, since the host liquid crystal has a positive dielectric anisotropy, the host liquid crystal molecules 4 and the guest pleochroic dye molecules take on a homeotropic alignment wherein the longer axes of the molecules are perpendicularly aligned with respect to the electrode planes (see FIG. 2). In this situation, since the longer axes of the pleochroic dye molecules are perpendicular to the electric vector of the incident white polarized light 6, the incident light is scarcely absorbed by the pleochroic dye molecules, and the guest-host material appears weakly colored. Thus, the formation of displays by electric driving can be realized by utilizing the above-described difference between the strongly colored state and the weakly colored state.

The pleochroic dyes to be used as a guest in a liquid crystal display utilizing the above-described guest-host effect are required to possess: (1) a high "order parameter" in a host liquid crystal; (2) a hue according to the end-use; (3) a sufficient solubility in a host liquid crystal; and (4) a high stability (light stability, heat stability, and electric stability).

Of the above-described requirements, order parameter (1) (usually presented as S) means the degree of alignment of absorption axis of dye molecule with respect to orientation direction of host liquid crystal molecules, and is defined by the folliowing equation:

$$S = \tfrac{1}{2}(3\cos^2\theta - 1)$$

wherein the term of $\cos^2\theta$ is timewise averaged, and $\theta$ represents an angle which the absorption axis of the dye molecule makes with the orientation direction of host liquid crystal molecules. The order parameter S of pleochroic dye molecule is experimentally determined by the following equation:

$$S = \frac{A_{//} - A_{\perp}}{2A_{\perp} + A_{//}}$$

wherein $A_{//}$ and $A_{\perp}$ represent the absorbances of the dye molecules for the light polarized parallel to and perpendicular to the orientation direction of the host-liquid crystal, respectively.

Specifically, the order parameter S is a value which governs the contrast of a guest-host type liquid crystal display device. With pleochroic dyes having parallel dichroism, the nearer the value to 1 which is the theoretical maximum, the less the degree of residual color in white parts, which serves to realize bright and highly contrasty display.

As to the hue (2) referred to hereinbefore, the dyes must satisfy requirements for a wide variety of hues, taking into consideration the purposes of coloration such as to increase displayed information, increase degree of freedom of design, and improve fashionability. Basically, if three primary colors of yellow, magenta, and cyan are obtained, all hues can be obtained by subtractive mixture of them. Therefore, with respect to the problem of hue, the three primary colors of yellow, magenta and cyan become important.

An object of the present invention is to provide a pleochroic dye which satisfies al the requirements (1), (3) and (4) described hereinbefore and a liquid crystal composition containing the dye.

Relationship between the molecular structure of pleochroic dye and the various properties has not fully been clarified yet, and hence it is quite difficult to select a pleochroic dye which has a desired hue and satisfies all requirements described hereinbefore based on knowledges about known dyes.

SUMMARY OF THE INVENTION

In view of the conventional techniques, as a result of extensive investigations, the inventors found an anthraquinone dye having excellent order parameter, solubility, stability and the like.

Accordingly, an object of the present invention is to provide an anthraquinone dye reprsented by the formula (I):

(I)

wherein $R^1$ is alkyl having 1 to 9 carbon atoms; alkoxyalkyl;

wherein $R^3$ is hydrogen, alkyl having 1 to 9 carbon atoms, alkoxy having 1 to 9 carbon atoms or cycloalkyl which may be substituted; or wherein $R^4$ is hydrogen, alkyl having 1 to 9 carbon atoms, alkoxy having 1 to 9 carbon atoms, alkoxyalkyl, wherein $R^5$ is hydrogen, alkyl having 1 to 9 carbon atoms, alkoxy having 1 to 9 carbon atoms or alkoxyalkyl, halogen or dialkylamino, and m is an integer of 1 to 3, and $R^2$ is alkyl having 1 to 18 carbon atoms, alkoxyalkyl, aryl which may be substituted, cycloalkyl, furfuryl, aralkyl or allyl, and a liquid crystal composition containing the dye.

The anthraquinone dye according to the present invention gives good results on the solubility with respect to a host liquid crystal. Further, the dye shows a good order parameter and, as a result, a display having an excellent contrast can be obtained.

BRIEF DESCRIPTION OF THE DRAWINS

1: Observer
2: Transparent glass substrate
3: Transparent electrode which had been subjected to a homogeneous alignment treatment
4: Nematic host liquid crystal molecule having a positive dielectric anisotropy
5: Pleochroic dye molecule
6: Incident white polarized light
7: Polarizing direction of incident light
8: Polarizing plate
9: Incident natural white light

DETAILED DESCRIPTION OF THE INVENTION

Examples of the substituent represented by $R^1$ in the formula (I) include alkyl such as methyl, ethyl, n- or iso-propyl, n-, iso- or sec-butyl, n-amyl, n-hexyl, n-heptyl, heptyl, n-octyl or n-nonyl; alkoxyalkyl such as 2-methoxyethyl, 2-ethoxyethyl, 2-n-propoxyethyl or 2-n-butoxyethyl; a group represented by such as cyclohexyl, trans-4-methylcyclohexyl, trans-4-ethylcyclohexyl, trans-4-n-propylcyclohexyl, trans-4-n-butylcyclohexyl, trans-4-tert-butylcyclohexyl, trans-4- n-pentylcyclohexyl, trans-4-n-hexylcyclohexyl, trans-4-n-heptylcyclohexyl, trans-4-n-octylcyclohexyl, trans-4-n-propoxycyclohexyl, trans-4-n-butoxycyclohexyl, trans-4-n-pentyloxycyclohexyl, trans-4-n-heptyloxycyclohexyl, trans-4-n-cyclohexylcyclohexyl, trans-trans-4-n-propylcyclohexylcyclohexyl, trans-trans-4-n-pentylcyclohexylcyclohexyl or trans-trans-4-n-heptylcyclohexylcyclohexyl; and a group represented by such as phenyl, 2-, 3-, or 4-methylphenyl, 2-, 3- or 4-methoxyphenyl, 2,3-, 2,4-, 2,5-, 2,6-, 3,4-, or 3,5-dimethylphenyl, 2,3,5- or 3,4,5-trimethylphenyl, 2-, 3-, or 4-ethylphenyl, 2-, 3- or 4-ethylphenyl, 2-, 3- or 4-ethoxyphenyl, 2-n-, 3-iso-, 4-n- or 4-iso-propylphenyl, 4-n-propoxyphenyl, 4-n-, 2-sec- or 4-sec-butylphenyl, 3-n- or 4-n-butoxyphenyl, 4-n-pentylphenyl, 4-n-pentyloxyphenyl, 4-n-hexylphenyl, 4-n-hexyloxyphenyl, 4-n-heptylphenyl, 4-n-heptyloxyphenyl, 4-n-octylphenyl, 4-n-octyloxyphenyl, 4-n-nonylphenyl, 2-, 3- or 4-chlorophenyl, 4-chloro-3-methylphenyl, 4-chloro-3,5-dimethylphenyl, 2-, 3- or 4-bromophenyl, 4-iodophenyl, 2-, 3-, or 4-fluorophenyl, 4-ethoxymethylphenyl, 4-n-propoxymethylphenyl, N,N-dimethyl-3-aminophenyl, p-(trans-4-n-propylcyclohexyl)phenyl, p-(trans-4-n-pentylcyclohexyl)phenyl, p-(trans-4-n-heptylcyclohexyl)phenyl, p-(p'-n-propylphenyl)phenyl, p-(p'-n-pentylphenyl)phenyl, p-(p'-ethoxyphenyl)phenyl, p-(p'-n-pentyloxyphenyl)phenyl, p-phenoxyphenyl, p-(p'-n-butylphenoxy)phenyl, p-benzylphenyl, p-(p'-n-butylbenzyl)phenyl, p-(p'-n-butylbenzyloxy)phenyl, p-(p'-n-butoxybenzyl)phenyl, p-(p'-n-heptyloxybenzyloxy)phenyl, p-(trans-4-n-propylcyclohexylmethoxy)phenyl, p-(trans-4-n-pentylcyclohexylmethoxy)phenyl or p-(trans-4-n-heptylcyclohexylmethoxy)phenyl.

Representative examples of the group represented by $R^2$ include alkyl having 1 to 18 carbon atoms such as methyl, ethyl, n- or iso-propyl, n-, sec-, iso- or tert-butyl, n-, sec-, tert- or iso-pentyl, n- or tert-hexyl, n- or tert-heptyl, n- or tert-octyl, tert-nonyl, n-decyl, n- or tert-dodecyl, n- or tert-tetradodecyl, n-pentadecyl, n- or tert-hexadecyl or n-octadecyl; alkoxyalkyl such as β-ethoxyethyl or γ-ethoxypropyl; aryl which may be substituted such as phenyl, naphthyl, o-, m- or p-tolyl, p-methoxyphenyl, 2,4-dimethylphenyl, p-ethylphenyl, p-ethoxyphenyl, p-n-propylphenyl, p-n-, p-iso-, p-sec- or p-tert-butylphenyl, p-n-butoxyphenyl, 2,4-diethylphenyl, p-n-, p-sec- or p-tert-pentylphenyl, p-n-hexylphenyl, p-n-heptylphenyl, p-n-octylphenyl, p-n-octyloxyphenyl, p-n-nonylphenyl or p-chlorophenyl; cycloalkyl such as cyclohexyl or cyclopentyl; furfuryl; aralkyl such as benzyl or p-methylbenzyl; and allyl.

The anthraquinone dye represented by the formula (I) can be synthesized, for example, by reacting a compound represented by the formula (II)

wherein X is halogen or nitro, with a compound represented by the formula (III)

$$HS\text{-}R^2 \quad (III)$$

wherein $R^2$ is the same as defined above, to obtain a compound represented by the formula (IV)

wherein $R^2$ is the same as defined above, and then esterifying the resulting compound with a compound represented by the formula (V)

$$HO\text{-}R^1 \quad (V)$$

wherein $R^1$ is the same as defined above.

Nematic liquid crystals to be used in the present invention can be selected from a considerably wide range of liquid crystals as long as they show a nematic state in an operating temperature range. Such nematic liquid crystals can take a cholesteric state when an optically active substance to be described hereinafter is added thereto. Examples of nematic liquid crystals include the substances given in Table 1 and derivatives thereof.

TABLE 1

| No. | Type | Example |
|---|---|---|
| 1 | Cyclohexylcyclohexane type | R'—⟨H⟩—⟨H⟩—X' |
| 2 | Phenylcyclohexane type | R'—⟨H⟩—⟨⟩—X' |
| 3 | Biphenyl type | R'—⟨⟩—⟨⟩—X' |

TABLE 1-continued

| No. | Type | Example |
|---|---|---|
| 4 | Terphenyl type |  |
| 5 | Cyclohexyl cyclohexanoate type |  |
| 6 | Phenyl cyclohexyl-carboxylate type |  |
| 7 | Ester type |  |
| 8 | Diester type |  |
| 9 | Biphenyl cyclohexyl-carboxylate type |  |
| 10 | Biphenyl ester type |  |
| 11 | Thioester type |  |
| 12 | Schiff type |  |
| 13 | Pyrimidine type |  |

TABLE 1-continued

| No. | Type | Example |
|-----|------|---------|
| | |  |
| | | |
| | | |
| 14 | Dioxane type | |
| 15 | Cyclohexylmethyl ether type | |
| 16 | Cinnamonitrile type | |

In the above formulae, R' represents alkyl or alkoxy, and X' represents nitro, cyano or halogen.

Liquid crystals shown in Table 1 above all show a positive dielectric anisotropy. Conventional ester type, azoxy type, azo type, Schiff type, pyrimidine type, diester type or biphenyl ester type liquid crystals showing a negative dielectric anisotropy can also be used by mixing with a liquid crystal showing a positive dielectric anisotropy so that the resulting mixed liquid crystal shows in the whole a positive dielectric anisotropy. Further, liquid crystals showing a negative dielectric anisotropy can be used as such by employing a proper element device constitution and a proper driving method.

As the host liquid crystal material used in the present invention, any liquid crystal compounds shown in Table 1 and the mixtures thereof may be used. A liquid crystal material sold by Merck & Co. under the trade name of ZLI 1132 which is a mixture of the following four liquid crystal compounds.

38.4% by weight

34.2% by weight

18.1% by weight

9.3% by weight and a liquid crystal material sold by British Drug House Co. under the trade name of E-7 which is a mixture of the following four liquid crystal compounds:

51% by weight

25% by weight

16% by weight

8% by weight have been found to be particularly useful in the present invention.

Examples of the optically active material which can be used in the present invention include chiral nematic compounds such as compounds prepared by introducing an optically active group (e.g., 2-methylbutyl, 3-methylbutoxy, 3-methylpentyl, 3-methylpentoxy, 4-methylhexyl or 4-methylhexyloxy) to a nematic liquid crystal compound. In addition, optically active materials such as alcohol derivatives (e.g., l-menthol, d-borneol, etc.) as described in Unexamined Published Japanese Patent Application No. 45546/76, ketone derivatives (e.g., d-camphor, 3-methylcyclohexanone, etc.), carboxylic acid derivatives (e.g., d-citronellic acid, l-camphoric acid, etc.), aldehyde derivatives (e.g., d-citronellal, etc.), alkene derivatives (e.g., d-limonene, etc.), amines, amides, nitriles, etc., can also be used.

As the element device, conventional element devices for liquid crystal display can be used in the present invention. The element devices which are constituted by two glass plates at least one of which is transparent, which are in parallel with each other and spaced from each other via a proper spacer, and on which a transparent plane electrode of arbitrary pattern is provided in a facing manner, are generally used. The spacer decides the gap between the two glass plates. From the practical point of view, the element gap is preferably 3 to 100 μm, most preferably 5 to 50 μm.

The anthraquinone dyes used for the display of the present invention and liquid crystal compositions containing such dyes will now be described in more detail by reference to following Examples.

EXAMPLE 1

(a) 5 g of 1-amino-4-nitroanthraquinone-2-carboxylic acid, 2.4 g of potassium carbonate and 3.8 g of p-tolylmercaptan was added to 50 ml of N-methylpyrrolidone and the resulting mixture was stirred under heating at 40° to 45° C. for 16 hours. Precipitates formed were filtered off, washed with 40 vol % ethanol aqueous solution and dried to obtain 5.5 g of 1-amino-4-(p-tolyl)-methylmercaptoanthraquinone-2-carboxylic acid.

(b) 1 g of 1-amino-4-(p-tolyl)mercaptoanthraquinone-2-carboxylic acid obtained in (a) above, 2 g of trans-4-n-butylcyclohexanol and 0.2 g of p-toluenesulfonic acid were added to 20 ml of o-dichlorobenzene and the reaction was conducted at 105° to 110° C. for 24 hours. After the completion of reaction, o-dichlorobenzene was distilled away under a reduced pressure. The residues were purified with a column chromatography using silica gel as a carrier and toluene as a separation solvent to obtain 0.4 g of 1-amino-4-(p-tolyl)mercaptoanthraquinone-2-carboxylic acid-trans-4-n-butylcyclohexyl ester. The resulting dye had a melting point of 176° to 177° C.

The maximum absorption wavelength in the visible region and order parameter S thereof are shown in Table 2 below.

In Table 2, means a trans-form.

EXAMPLE 2

The dyes shown in Table 2 below were prepared in the same manner as in Example 1 above.

The maximum absorption wavelength and order parameter thereof are shown in Table 2 below.

TABLE 2

| No. | R¹ | —S—R² | Maximum Absorption Wavelength (nm) | Order Parameter |
|---|---|---|---|---|
| 1 | —⟨H⟩—C₄H₉(n) | —S—⟨⟩—CH₃ | 588 | 0.77 |
| 2 | —⟨H⟩—C₄H₉(n) | —S—⟨⟩ | 586 | 0.76 |
| 3 | —⟨⟩—C₆H₁₃(n) | —S—⟨⟩(CH₃)—CH₃ | 599 | 0.74 |
| 4 | —⟨H⟩—C₃H₇(n) | —S—⟨⟩—C₄H₉(n) | 587 | 0.78 |

TABLE 2-continued

[Structure: 1-amino-2-COOR¹, 4-S-R² anthraquinone]

| No. | R¹ | —S—R² | Maximum Absorption Wavelength (nm) | Order Parameter |
|---|---|---|---|---|
| 5 | cyclohexyl(H)—C$_8$H$_{17}$(n) | —S—C$_6$H$_4$—Cl | 580 | 0.77 |
| 6 | —C$_4$H$_9$(n) | —S—CH$_2$—C$_6$H$_5$ | 600 | 0.72 |
| 7 | —C$_2$H$_4$OC$_4$H$_9$(n) | —S—CH$_2$—C$_6$H$_4$—CH$_3$ | 599 | 0.70 |
| 8 | phenyl—C$_4$H$_9$(n) | —S—naphthyl | 598 | 0.75 |
| 9 | cyclohexyl(H)—cyclohexyl(H) | —S—C$_3$H$_7$(n) | 599 | 0.78 |
| 10 | cyclohexyl(H)—C$_4$H$_9$(n) | —S—C$_8$H$_{17}$(n) | 598 | 0.77 |
| 11 | cyclohexyl(H)—cyclohexyl(H)—C$_3$H$_7$(n) | —S—C$_5$H$_{11}$(n) | 598 | 0.79 |
| 12 | cyclohexyl(H)—C$_4$H$_9$(n) | —S—cyclohexyl(H) | 600 | 0.73 |
| 13 | phenyl—C$_4$H$_9$(n) | —S—cyclohexyl(H) | 602 | 0.73 |
| 14 | phenyl—OC$_5$H$_{11}$(n) | —S—CH$_2$—CH=CH$_2$ | 602 | 0.76 |
| 15 | phenyl—CH$_2$OC$_3$H$_7$(n) | —S—C$_3$H$_7$(iso) | 601 | 0.77 |

TABLE 2-continued

Structure: anthraquinone with NH$_2$ at position 1, COOR$^1$ at position 2, S—R$^2$ at position 4, and two C=O groups (9,10-positions).

| No. | R$^1$ | —S—R$^2$ | Maximum Absorption Wavelength (nm) | Order Parameter |
|---|---|---|---|---|
| 16 | -phenyl-cyclohexane(H)-C$_3$H$_7$(n) | —S—C$_4$H$_9$(sec) | 601 | 0.78 |
| 17 | -phenyl-phenyl-OC$_3$H$_7$(n) | —S—C$_5$H$_{11}$(iso) | 602 | 0.79 |
| 18 | -phenyl-O-phenyl | —S—C$_4$H$_9$(tert) | 602 | 0.76 |
| 19 | -phenyl-CH$_2$-phenyl | —S—C$_3$H$_7$(n) | 601 | 0.77 |
| 20 | -phenyl-OCH$_2$-phenyl-C$_3$H$_7$(n) | —S-phenyl | 590 | 0.76 |
| 21 | -phenyl-OCH$_2$-cyclohexane(H)-C$_3$H$_7$(n) | —S-phenyl-CH$_3$ | 592 | 0.77 |
| 22 | -phenyl(Cl)(CH$_3$) | —S-cyclohexane(H) | 600 | 0.72 |
| 23 | -phenyl(CH$_3$)(CH$_3$) | —S-cyclopentane(H) | 602 | 0.73 |
| 24 | -phenyl-N(CH$_3$)$_2$ | —S—C$_5$H$_{11}$(n) | 600 | 0.75 |

The characteristic properties of each dye shown in Table 2 were determined as follows. That is, one of the dyes shown in Table 2 was added as a pleochroic dye to the foregoing phenylcyclohexane type mixed liquid crystal ZLI-1132, heated to 70° C. or higher, well stirred when the mixed liquid crystal became isotropic liquid, then allowed to cool. These procedures were repeated to dissolve the dye.

The thus prepared liquid crystal composition was sealed in an element composed of upper and lower two glass plates with a plate-to-plate gap of 10 to 100 μm, with the surface of the plate to be in contact with the liquid crystal having been coated with a polyamide resin and, after hardening the resin, having been sujected to rubbing treatment to conduct homogeneous orientation treatment. In the above-described element device having been subjected to the orientation treatment, the above-described liquid crystal composition took, when no electric potential was applied thereto, a homogeneously oriented state as shown in FIG. 1 and the dye molecules are similarly oriented according to the host liquid crystal.

Absorption spectrum of the thus prepared guest-host type element was measured using the light polarized parallel and perpendicular to the direction of the liquid crystal molecules to determine absorbances A ∥ and A⊥ of the dye for the polarized lights and maximum absorption wavelength. In determining absorbance of the dye, corrections were made for the absorption of host liquid crystal and of glass plates and for reflection loss of the element. Order parameter S was determined according to the foregoing equation:

$$S = \frac{A_{//} - A\perp}{2A\perp + A_{//}}$$

using the thus determined absorbances A ∥ and A⊥ of the dye for the polarized lights.

EXAMPLE 3

Figure 3:
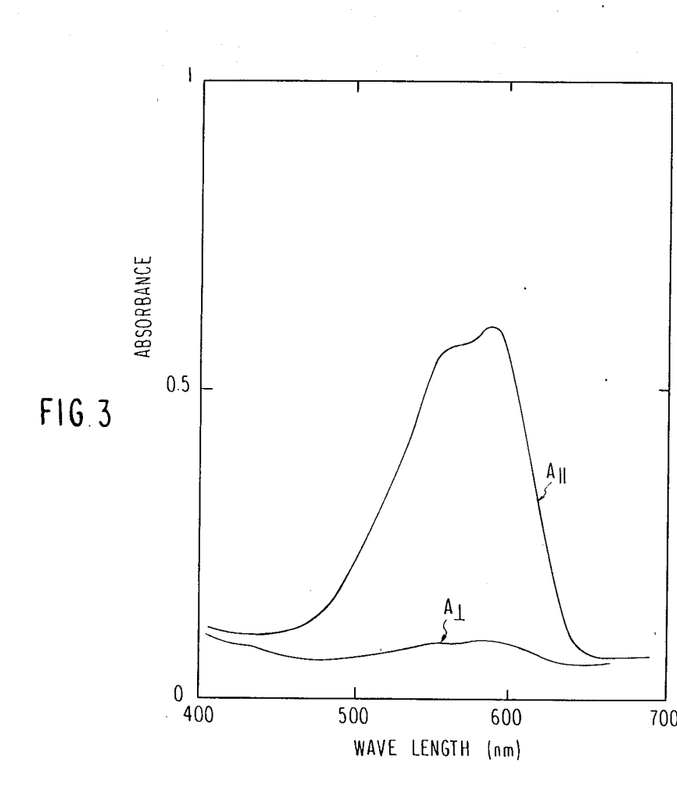
FIGS. 3 to 5 show the absorption spectrum in Examples 3 to 5 of the present invention, respectively.

A liquid crystal composition prepared by adding dye No. 1 in Table 2:

to the same liquid crystal as used in Example 2 in an amount of 1.02% by weight was sealed in the same element as used in Example 2 (plate-to-plate gap: about 10.8 μm), and absorption spectrum was measured in the same manner as in Example 2. The spectrum thus obtained is shown in FIG. 3. Maximum absorption wavelength in visible region was 588 nm, and A ∥ and A⊥ at the maximum absorption wavelength were 0.552 and 0.049, respectively. Therefore, order parameter S of the dye of this example was 0.77.

EXAMPLE 4

Figure 4:
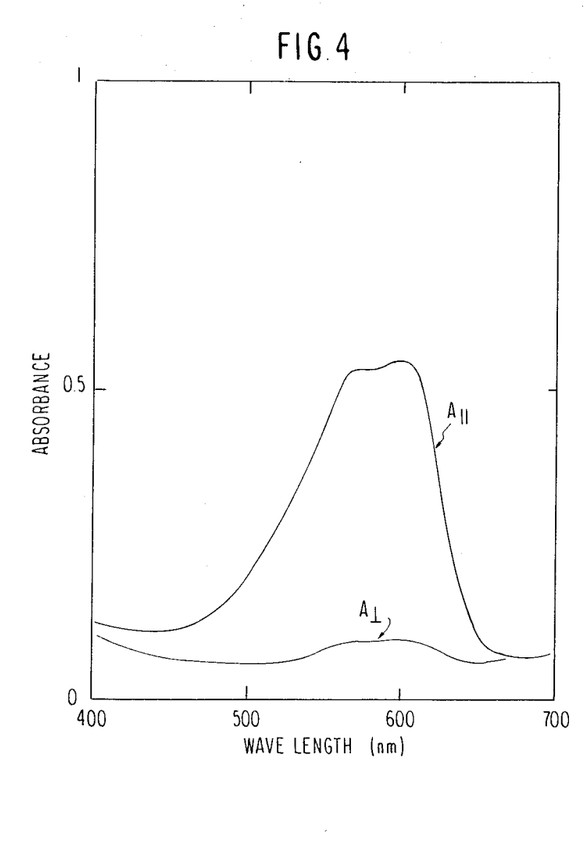

A liquid crystal composition prepared by adding dye No. 10 in Table 2:

to the same liquid crystal as used in Example 2 in an amount of 1.14 wt % was sealed in the same element as used in Example 2 plate-to-plate gap: about 10:0 μm), and absorption spectrum was measured in the same manner as in Example 2. The spectrum thus obtained is shown in FIG. 4. Maximum absorption wavelength in visible region was 598 nm, and A ∥ and A⊥ at the maximum absorption wavelength were 0.500 and 0.045, respectively. Therefore, order parameter S of the dye of this Example was 0.77.

EXAMPLE 5

Figure 5:
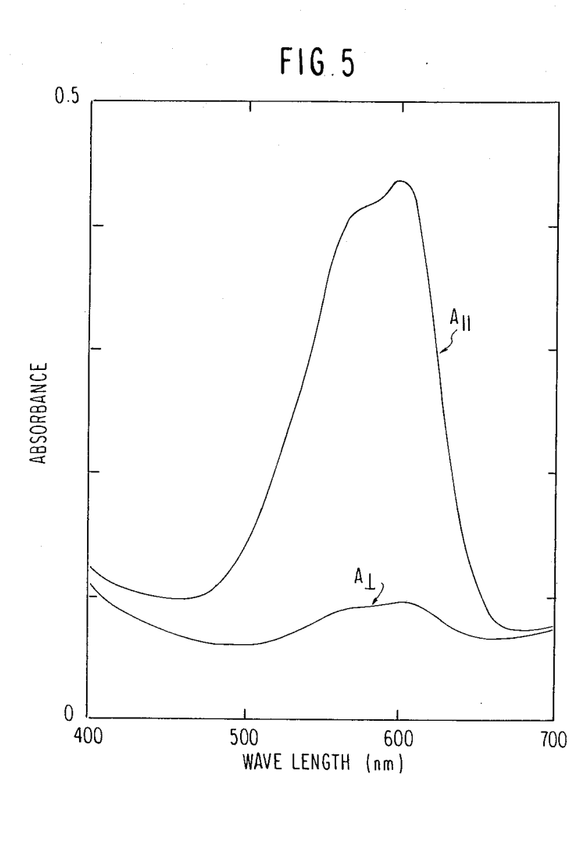

A liquid crystal composition prepared by adding dye No. 12 in Table 2:

to the same liquid crystal as used in Example 2 in an amount of 0.95% by weight was sealed in the same element as used in Example 2 (plate-to-plate gap: about 9.4 μm), and absorption spectrum was measured in the same manner as in Example 2. The spectrum thus obtained in shown in FIG. 5. Maximum absorption wavelength in visible region was 600 nm, and A ∥ and A⊥ at the maximum absorption wavelength were 0.380 and 0.041, respectively. Therefore, order parameter S of the dye of this Example was 0.73.

While the invention has been described in detail and with reference to specific embodiments thereof, it will be apparent to one skilled in the art that various changes and modifications can be made therein without departing from the spirit and scope thereof.

What is claimed is:

1. An anthraquinone dye represented by the formula (I)

wherein $R^1$ is alkyl having 1 to 9 carbon atoms; alkoxyalkyl;

wherein $R^3$ is hydrogen, alkyl having 1 to 9 carbon atoms, alkoxy having 1 to 9 carbon atoms or cycloalkyl which may be substituted; or wherein $R^4$ is hydrogen, alkyl having 1 to 9 carbon atoms, alkoxy having 1 to 9 carbon atoms, alkoxyalkyl, wherein $R^5$ is hydrogen, alkyl having 1 to 9 carbon atoms or alkoxyalkyl, halogen or dialkylamino, and m is an integer of 1 to 3, and $R^2$ is alkyl 1 to 18 carbon atoms, alkoxyalkyl, aryl which may be substituted, cyloalkyl, furfuryl, aralkyl or allyl.

2. An anthraquinone dye as claimed in claim 1, wherein $R^1$ is wherein $R^3$ is hydrogen, alkyl having 1 to 9 carbon atoms, alkoxy having 1 to 9 carbon atoms or cycloalkyl which may be substituted, or wherein $R^4$ is hydrogen, alkyl having 1 to 9 carbon atoms, alkoxy having 1 to 9 carbon atoms, alkoxy-alkyl, wherein $R^5$ is hydrogen, alkyl having 1 to 9 carbon atoms or alkoxyalkyl, halogen or dialkylamino and m is an integer of 1 to 3, and $R^2$ is alkyl having 1 to 18 carbon atoms, aryl which may be substituted, cycloalkyl, aralkyl or allyl.

3. An anthraquinone dye as claimed in claim 1, wherein $R^1$ is wherein $R^{3'}$ is alkyl having 1 to 9 carbon atoms or cyclohexyl which may be substituted with alkyl, or wherein $R^{4'}$ is alkyl having 1 to 9 carbon atoms, alkoxy having 1 to 9 carbon atoms, alkoxyalkyl, wherein $R^5$ is hydrogen, alkyl having 1 to 9 carbon atoms, alkoxy having 1 to 9 carbon atoms or alkoxyalkyl, and $R^2$ is alkyl having 1 to 18 carbon atoms, aryl which may be substituted or cycloalkyl.

4. An anthraquinone dye as claimed in claim 1, wherein $R^1$ is wherein $R^{3'}$ is alkyl having 1 to 9 carbon atoms or cyclohexyl which may be substituted with alkyl, or wherein $R^{4''}$ is alkyl having 1 to 9 carbon atoms, alkoxy having 1 to 9 carbon atoms, wherein $R^{5'}$ is alkyl having 1 to 9 carbon atoms or alkoxy having 1 to 9 carbon atoms, and $R^2$ is alkyl having 1 to 18 carbon atoms, aryl which may be substituted or cycloalkyl.

5. An anthraquinone dye as claimed in claim 1, wherein $R^1$ is wherein R⁴‴ is alkyl having 1 to 9 carbon atoms or alkoxy having 1 to 9 carbon atoms, and R² is alkyl having 1 to 18 carbon atoms, phenyl which may be substituted with alkyl, naphthyl or cyclohexyl.

6. An anthraquinone dye as claimed in claim 1, wherein R¹ is wherein R³′ is alkyl having 1 to 9 carbon atoms or cyclohexyl which may be substituted with alkyl, and R² is alkyl having 1 to 18 carbon atoms, aryl which may be substituted or cycloalkyl.

7. An anthraquinone dye as claimed in claim 1, wherein R¹ is wherein R³″ is alkyl having 1 to 9 carbon atoms, and R² is alkyl having 1 to 18 carbon atoms, phenyl which may be substituted with alkyl, or cyclohexyl.

8. An anthraquinone dye as claimed in claim 1, wherein R¹ is wherein R³‴ is alkyl having 1 to 9 carbon atoms and R² is alkyl having 1 to 18 carbon atoms or phenyl which may be substituted with alkyl.

9. A liquid crystal composition containing an anthraquinone dye represented by the formula (I)

wherein R¹ is alkyl having 1 to 9 carbon atoms; alkoxyalkyl;

wherein R³ is hydrogen, alkyl having 1 to 9 carbon atoms, alkoxy having 1 to 9 carbon atoms or cycloalkyl which may be substituted; or wherein R⁴ is hydrogen, alkyl having 1 to 9 carbon atoms, alkoxy having 1 to 9 carbon atoms, alkoxyalkyl, wherein R⁵ is hydrogen, alkyl having 1 to 9 carbon atoms, alkoxy having 1 to 9 carbon atoms or alkoxyalkyl, halogen or dialkylamino, and m is an integer of 1 to 3, and R² is alkyl having 1 to 18 carbon atoms, alkoxyalkyl, aryl which may be substituted, cycloalkyl, furfuryl, aralkyl or allyl.

* * * * *